United States Patent [19]

Ten Eyck et al.

[11] Patent Number: 5,032,441
[45] Date of Patent: Jul. 16, 1991

[54] INTUMESCENT CONFORMING MOUNTING PAD

[75] Inventors: John D. Ten Eyck, Lewiston; Orland C. Pitts, Ransomville, both of N.Y.

[73] Assignee: The Carborundum Company, Cleveland, Ohio

[21] Appl. No.: 608,595

[22] Filed: Oct. 31, 1990

Related U.S. Application Data

[63] Continuation of Ser. No. 345,757, May 1, 1989, abandoned.

[51] Int. Cl.⁵ .......................... B32B 3/06; B32B 3/08
[52] U.S. Cl. .................................. 428/77; 428/194; 428/198; 428/201; 428/920; 428/921
[58] Field of Search ................ 428/77, 194, 195, 210, 428/920, 921, 198, 201

[56] References Cited

U.S. PATENT DOCUMENTS

| | | |
|---|---|---|
| 3,227,241 | 1/1966 | Mattoon .................................. 181/56 |
| 3,798,006 | 3/1974 | Balluff ..................................... 23/288 |
| 3,876,384 | 4/1975 | Santiago et al. ........................ 23/288 |
| 3,891,396 | 6/1975 | Musall et al. ........................... 23/288 |
| 4,048,363 | 9/1977 | Langer et al. ............................ 428/77 |
| 4,142,864 | 3/1979 | Rosynsky et al. ................... 422/179 |
| 4,239,733 | 12/1980 | Foster et al. ......................... 422/179 |
| 4,256,700 | 3/1981 | Smith et al. .......................... 422/177 |
| 4,269,807 | 5/1981 | Bailey et al. ......................... 422/179 |
| 4,425,304 | 1/1984 | Kawata et al. ....................... 422/171 |

*Primary Examiner*—Alexander S. Thomas
*Attorney, Agent, or Firm*—George W. Moxon, II; Joseph G. Curatolo; Larry W. Evans

[57] ABSTRACT

As an article of manufacture an intumescent conforming mounting pad for fragile structures comprised of at least two plys of intumescent sheet material adhesively bonded together over a predetermined part of their adjoining faces said plys and being offset a predetermined amount lengthwise whereby said pad can be bent around a fragile structure and the ends can be joined without cracking or buckling.

6 Claims, 1 Drawing Sheet

INTUMESCENT CONFORMING MOUNTING PAD

This is a File Wrapper continuation of co-pending application Ser. No. 07/345,757 filed May 1, 1989, abandoned.

The present invention relates to a sheet material for use in mounting fragile monolith structures used to treat exhaust gases. More specifically, the present invention relates to a sheet material used to mount and support the frangible monolith on which the catalytic material is deposited for interaction with the exhaust gases.

BACKGROUND OF THE INVENTION

Such monoliths may be formed of a brittle fireproof ceramic material such as aluminum oxide, silicon dioxide, magnesium oxide, zirconia, cordierite, silicon carbide and the like. These ceramic materials provide a skeleton type of structure with a plurality of tiny flow channels. Small shockloads are sufficient to crack or crush the monolith. Due to this brittleness problem which exists when using this type of catalytic device in connection with motor vehicles in which the ceramic monolith is located in a housing connected to the exhaust gas system, much effort has been expended in developing means for support of the monolith in its housing so that the monolith would be immune to or unaffected by shockloads. Representative of these efforts are discussed:

U.S. Pat. No. 3,798,006 discloses securement of a monolith type catalyst element in its housing by a differentially hardened fibrous lining. The monolith is supported by a felted layer or sleeve of ceramic fibers which are compressed between the monolith and a shell.

U.S. Pat. No. 3,876,384 discloses a monolithic catalyst carrier body which is resiliently mounted in a reactor casing by surrounding the monolith with a protective jacket which includes highly heat-resistant steel reinforcing means embedded in ceramic fiber and binder means.

U.S. Pat. No. 3,891,396 discloses an elastic holder for monolithic catalyst bodies. The holder consists of a metallic corrugated tube which simultaneously forms the outer wall of the exhaust conduit and which is provided with a mechanical bias which safely holds the monolithic catalyst body and presses it against an end bearing.

U.S. Pat. No. 3,916,057 discloses a process for mounting monolithic catalyst support elements which utilizes an intumescent sheet material containing vermiculite or other expandable mica. The intumescent sheet material functions as a resilient mounting material by expansion in situ. The thermal stability and resilience of the sheet after exfoliation compensate for the difference in thermal expansion of the metal canister and the monolith and absorbs mechanical vibrations transmitted to the fragile monolith or forces which would otherwise be imposed on the monolith due to irregularities in the metallic or ceramic surfaces. The sheet material is preferably made by conventional paper making techniques, although coating or extruding on a sheet of Craft paper, polyethylene terephthalate fiber, or glass mat or fabric is disclosed. But, the patent notes that the principal disadvantages of coating a ceramic directly is controlling the thickness of the dry coating.

U.S. Pat. No. 4,048,363 discloses a laminated intumescent mounting mat using an offset of the adhesively joined layers for use in wrapping a ceramic catalytic monolith. The adhesive on the offset is covered with a release layer which is removed after wrapping to join the ends together. After heating, expansion of the intumescent material in the mat secures the monolith in its housing or covering.

U.S. Pat. No. 4,142,864 discloses mounting of a catalytic ceramic monolith by positioning a resilient, flexible ceramic fiber mat or blanket in the space between the catalytic monolith and the inner surface of the casing. This blanket is compressed upon installation of annular plug members which are inserted at each end of the ceramic monolith between it and the casing. The plugs may be formed of solid metal, wire mesh or hollow metal.

U.S. Pat. Nos. 4,239,733 and 4,256,700 disclose a catalyst coated ceramic monolith supported in a sheet metal housing by both a wire mesh sleeve and an intumescent sleeve which are positioned adjacent each other in non-overlapping fashion.

U.S. Pat. No. 4,269,807 discloses a resilient mounting for a ceramic catalytic monolith in which the monolith is surrounded with a blanket of knitted wire mesh which is partially compressed throughout its length. Overlying the knitted wire mesh is a band of high-temperature intumescent material containing ceramic fiber as a viscous caulking or paste within the matrix of the metal mesh. In one of the constructions disclosed the ceramic monolith is coated with ceramic fibers followed by surrounding it with a blanket of knitted wire mesh.

U.S. Pat. No. 4,305,992 discloses flexible intumescent sheet material containing unexpanded ammonium ion-exchanged vermiculite flakes and suitable for use in mounting automotive catalytic converter monoliths.

U.S. Pat. No. 4,328,187 discloses an elastic holder for axial suspension of a ceramic catalytic monolith within a housing. The monolith is surrounded with a layer of heat-resistant mineral fiber material, over which lies a jacket or sleeve of good heat-insulating mineral material, and a layer made from a highly-elastic material such as foam, asbestos or glass fiber fleece, or from a metallic wire mesh. The layers provide a cushion which serves as a damping element extending within the housing over the entire length of the monolith and elastically suspending the monolith together with its ceramic fiber wrapping and sleeve against the walls of the housing.

U.S. Pat. No. 4,335,077 discloses support of a ceramic catalytic monolith by means of elastically deformable damping rings or envelopes, where the monolith is surrounded by a protective jacket of heat-resistant cement or putty reinforced with ceramic fibers or metal in the form of a wire mesh or the like. The protective jacket is enveloped around its circumference by a soft mineral fiber layer which is compressed between the housing wall and the protective jacket.

U.S. Pat. No. 4,353,872 discloses support of a ceramic catalytic monolith within its casing by means of a gas seal member formed of heat-resistant and expandable sheet material, for example, vermiculite, quartz or asbestos, which envelopes a portion of the monolith, including a separate layer of generally cylindrically knitted wire or resilient support disposed between the monolith and its casing to dampen external forces applied to the monolith.

U.S. Pat. No. 4,425,304 discloses a catalytic converter in which ceramic catalytic monoliths are supported by an elastic pad of expanded metal or steel mesh fabrics or a knitted web of ceramic fibers at their ends and are wrapped with respective cushioning layers of expanded metal or any other known flame-retardant, corrosion-resistant cushioning material.

U.S. Pat. No. 4,432,943 discloses an elastic suspension for a monolithic catalyst body in which the annular space between the housing and the catalyst body is filled with heat-resistant mineral fiber material which serves to prevent bypass of exhaust gas and as thermal insulation, and a construction where the monolith is surrounded by a mineral fiber layer and a rigid sleeve of heat-resistant metal positioned over the mineral fiber layer. The annular space between the sleeve and the housing may be filled with ceramic fiber.

In spite of the large variety of support materials available, a typical passenger automobile catalytic converter which utilizes a ceramic monolith will be supported by intumescent sheet material like that described in U.S. Pat. No. 3,916,057 or 4,305,992, having, e.g., a nominal thickness of 0.195 inch and a nominal density of 40 pcf. This material is bent to conform to the monolith and compressed during installation of the ceramic monolith into its metallic shell in which it may have a nominal thickness of 0.130 inch and a nominal density of about 60 pounds per cubic foot (pcf). To withstand the higher operating temperatures often encountered in the operating cycle of a higher gross vehicle weight (GVW) vehicle such as a truck, the overall nominal thickness of the compressed installed intumescent layer may be increased to about 0.24 inch and the nominal density may be increased to about 64–70 pounds per cubic foot as installed.

As intumescent sheet materials are bent around the monolith, a tensile stress is exerted on the outer most intumescent layer, if there are several layers, or the outer surface if there is a single layer, which can result in tearing of the surface or flaking of the vermiculite in the intumescent layer. When this happens, the sheet materials may not be useful and closure problems can result if the flakes find their way to the flanges which are used to close the outer metal casing. Another concern is that the thicker intumescent materials can aggravate the situation, because the inner surface may buckle and lead to a non-uniform inner surface. This can result in non-uniform compression force being applied during assembly, and may result in direct leakage paths for exhaust gases. Thus, there is a need for intumescent sheet materials which minimize installation problems while providing a satisfactory mount for monolithic catalytic converters.

BRIEF SUMMARY OF THE INVENTION

The primary purpose of this invention is to provide an improved mounting for frangible structures, such as ceramic monoliths, which is suitable and very convenient for mass manufacture and for use in the exhaust systems of internal combustion engines.

According to the present invention, this purpose is accomplished by a handleable, flexible, crack resistant composite intumescent sheet material comprising at least two intumescent layers adhesively bonded together over only a part of their adjoining faces and offset a predetermined amount lengthwise so that when the sheet is bend around, e.g., a ceramic monolith, the ends can be joined without cracking or buckling. The sheet material can have a composite thickness of about 0.1 inch to about 5 inches.

The composite sheet can further include a ceramic fiber layer for mounting in contact with the ceramic monolith, such as a catalytic converter, or an outer reinforcing layer such as Craft paper, plastic film or inorganic fiber fabric. The intumescent sheet material of the present invention allows the individual layers to slide past one another as the composite sheet is bent around the ceramic monolith in the installation process. The tensile stress in each layer is effectively minimized. By not allowing enough force to pull the surface apart, the outer surface of the sheet will not tear and the loss of vermiculite in the intumescent layers is minimized. Consequently, there will be no or little vermiculite to get into, e.g., a flange and prevent a proper sealing of the monolith.

Thus, the sheet material of the present invention is very convenient for mass manufacture and in mounting fragile structures.

DETAILED DESCRIPTION OF THE INVENTION

Figure 1:
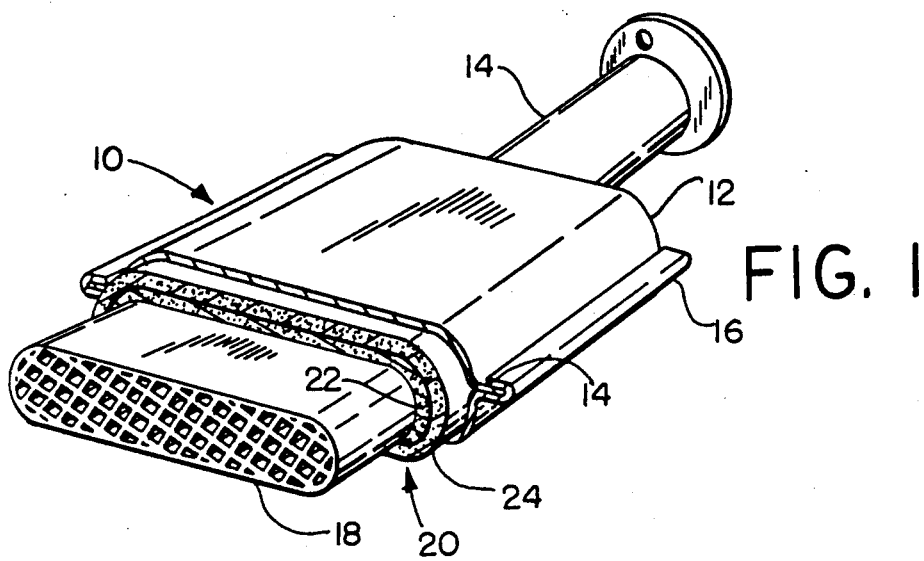
FIG. 1 is a fragmentary isometric view of a device embodying the invention.
Figure 2:
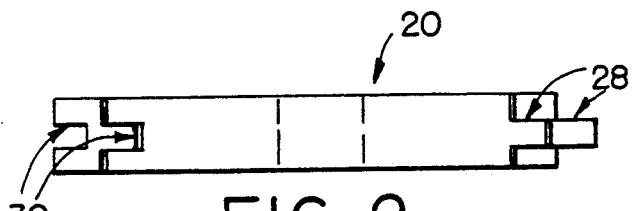
FIG. 2 is a plan view of an intumescent sheet material embodying the invention.

Referring to the figures, there is shown at numeral 10 a catalytic converter generally. The present invention is not intended to be limited to use in the catalytic converter shown, and so is shown only as an example to illustrate the invention. In fact, the sheet material could be used to mount any fragile structure, such as a diesel particulate trap or the like. Catalytic converter 10 includes a generally tubular housing 12 formed of two pieces of metal, e.g. high temperature-resistant steel. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a frangible ceramic monolith 18 which is supported and restrained within housing 12 by intumescent sheet material 20 to be further described. Monolith 18 includes a plurality of gas-pervious passages which extend axially from its inlet end fact at one end to its outlet end face at its opposite end. Monolith 18 is constructed of a suitable refractory or ceramic material in known manner and configuration. Monoliths are typically oval or round in cross-sectional configuration, but other shapes are possible.

In accordance with the present invention, the monolith is spaced from its housing by a distance which can be at least about 0.05 inch, and can be up to one inch or more. This space is filled with a intumescent mounting sheet material 20 found in FIGS. 2–7 to support the ceramic monolith 18.

As shown in FIGS. 2–5, the sheet material 20 comprises two intumescent layers 22 and 24 bonded at 26 by an adhesive. In the embodiment shown in FIG. 2 and 4, the sheet material 20 is comprised of offset layers 22 and 24 and has a tongue-in-groove arrangement such that when the sheet material 20 is bent about the monolith 18, the tongue 28 at one end of the sheet material 20 will fit into the groove 30 at the opposite end to complete the gas seal for which the intumescent layer is employed when the housing 12 is closed around the monolith. The amount of off-set, i.e., the predetermined off-set, will depend upon the thickness of the layers as well as the circumference around which the sheet material is bent and the stretch and compression of the layers. For example, the following formulas would be used to determine the offset of a two layer composite (i.e., with an inside (I) layer and outside (O) layer), each having a thickness (T) and length (L), for wrapping around a monolith of radium $R_M$:

$$L_I = 2\pi(R_M + \tfrac{1}{2}R_I) \quad \text{(A)}$$

$$L_O = 2\pi(R_M + T_I + \tfrac{1}{2}T_O) \quad \text{(B)}$$

$$\text{OFFSET} = L_O - L_I \quad \text{(C)}$$

Where higher temperatures are encountered, such as in higher GVW vehicles or trucks, it may be desirable to increase the thickness of the intumescent layer, such as by making it from a thicker layer or using more than two layers, or to include an additional layer of, e.g., ceramic fiber (not shown) which can be placed against the monolith. This is desirable where the intended monolith operating temperatures are up to 2000° F. or higher. The ceramic fiber layer could have an installed nominal thickness of at least 0.03 inch and an installed nominal density of at least about 40 pcf. The intumescent layer has an installed (compressed) nominal thickness of at least about 0.2 inches and an installed nominal density of about 70 pcf. The ceramic fiber can be in various forms such as paper, blanket, mat or felt provided they impart the necessary thermal insulation and mechanical support.

FIGS. 2-3 and 4—5 show two embodiments of the intumescent composite sheet material in accordance with the present invention. In the embodiment shown in FIG. 3, the layers are bonded together near the middle, while in the embodiment shown in FIG. 5, the layers are bonded together at one end.

Figure 3:
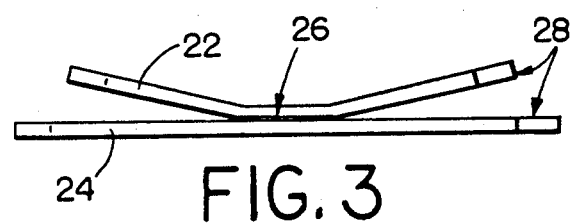
FIG. 3 is a side view of the intumescent sheet material in FIG. 2.
Figure 4:
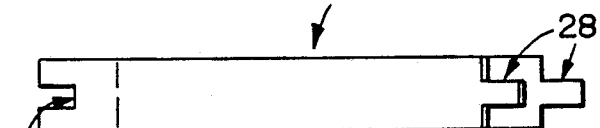
FIG. 4 is a plan view of another embodiment of an intumescent sheet material in accordance with the present invention.
Figure 5:
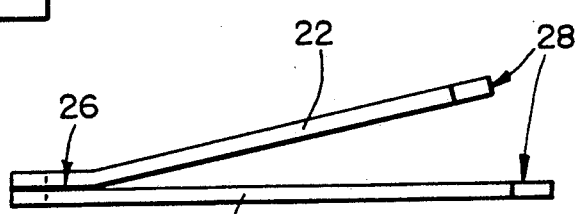
FIG. 5 is a side view of the sheet material in FIG. 4.

The adhesive material is not critical as to its composition. What is important is that it should maintain the layers in contact and have strength enough to overcome the shear forces of bending. Further, the amount of area bonded is not critical other than it should be enough to keep the plies bonded together and prevent them from rotating from the axial alignment along which they are joined while allowing the plies to move along their axial alignment, i.e., their length. Thus, the bond area could be any amount less than 100% of the length and preferably will be less than about 20% of the length of the layers in one spot, and could cover up to the width of the plies, although that is not critical. As can readily be appreciated, the precise amount of adhesive bond area will depend upon the strength of the adhesive, but it should be enough to allow the sheet material or mounting pad to be handled for placement around or in conjunction with a fragile structure which may in turn be placed in a container which is subsequently closed. In FIG. 3, the bond is near the middle, while in FIG. 5, the bond is near one end.

The term mounting pad is intended to mean and include a two ply intumescent sheet material as well as multiply sheet material including layers of ceramic fiber, reinforcing layer, and the like. The term fragile structure is intended to mean and include structures such as ceramic or metal monoliths or the like which are fragile or frangible in nature and would benefit from a mounting pad as described herein.

Figure 6:
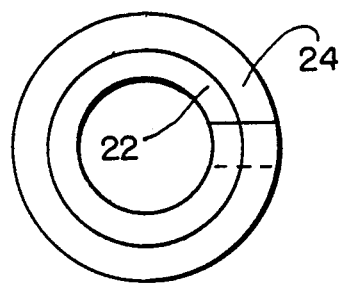
FIGS. 6 and 7 are side and plan views, respectively of assembled intumescent sheet material in accordance with the present invention.
Figure 7:
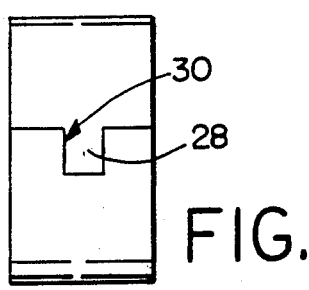

As shown in FIGS. 6 and 7, as the composite sheet material is bent around a monolith (shown as circular in FIGS. 6 and 7, the layers will slide until the ends come into match-up contact and tongue 28 fits into groove 30. The fact that the thicker composite is achieved using plural layers means that there is not enough stress developed in the outermost surface or layer of the composite to exert a tearing force. This minimizes the amount of vermiculite flakes which would fall out, and facilitates a faster installation with minimum rejects.

The thicker the intumescent layer, the more susceptible the layer is to cracking and to loss of vermiculite flakes. This condition can be even more severe if a ceramic fiber layer is used to provide a thicker layer. The present invention facilitates installation of the sheet material by preventing cracking of sheet material 22 and loss of vermiculite flakes and restraining the sheet material so that when housing 12 is closed, the sheet material will bend without cracking, thus speeding up the installation operation.

The intumescent sheet material may be produced from unexpanded vermiculite, hydrobiotite, or water-swelling tetrasilicic fluorine mica using organic and/or inorganic binders to provide a desirable degree of wet strength. The sheet material can be produced by standard paper making techniques as described, for example, in U.S. Pat. No. 3,458,329, the disclosure of which is incorporated herein by reference, to produce a desirable thickness from about 0.1 to about 25 mm.

The intumescent sheet material is utilized in automobile exhaust catalytic converters as a mounting material by expansion in situ. The expanded sheet then holds the ceramic core or catalyst support in place in the container or canister. The thermal stability and resilience of the sheet after exfoliation compensate for the difference in thermal expansion of the metal canister and the ceramic substrate, for vibration transmitted to the fragile device and for irregularities in the metallic or ceramic surfaces. The mounting material is found to be superior not only in that it is inexpensive and simple to use, but also it effectively solves the problems associated with thermal and mechanical shock inherent in such devices. Therefore, it is important that its installation be as simple as possible and not generate problems in of itself.

An eminently suitable material for monolith temperatures up to 2300° F. for ceramic fiber layer 20 has been found to be Fiberfrax ® 970 paper available from The Carborundum Company, Niagara Falls, N.Y. This product is made from bulk alumino-silicate glassy fiber having approximately 50—50 alumina/silica and a 70/30 fiber/shot ratio. About 93 weight percent of this paper product is ceramic fiber/shot, the remaining 7 percent being in the form of an organic latex binder. For even higher monolith temperatures, papers produced from Fibermax TM polycrystalline mullite ceramic fibers available from this manufacturer may be employed. Alumina fibers may also be employed where high monolith temperatures are expected.

While a presently preferred embodiment of the invention has been illustrated and described, it will be apparent to those skilled in the art that modifications thereof are within the spirit and scope of the invention. For example, the structure need not be made of ceramic and could be a fragile metal monolith. Further, the monolith may be for used other than as a catalytic converter, such as an electrically resistant-heated element or as a regenerable particulate trap for use with diesel engines. In assemblies where even higher monolith operating temperatures are anticipated, e.g. 2500° F., the ceramic fiber paper layer could be formed, for example, of Fibermax TM polycrystalline mullite fibers or of alumina fibers to thermally insulate the radially outer layers of vermiculite-containing intumescent material from exceeding their maximum continuous use temperature. The ceramic monolith may be first wrapped in polycrystalline alumino-silicate fiber, then wrapped with vitreous alumino-silicate fiber and then wrapped with intumescent material. The outside temperature of the housing of the catalytic converter may be reduced by increasing the thickness of the combined ceramic fiber and intumescent material layers. For simplicity of illustration, housing 12 has been shown to be smooth. In most applications, however, it si recommended that the housing be ribbed or otherwise reinforced to stiffen it to resist the force exerted by the compressed ceramic fiber paper and intumescent sheet materials.

"Ceramic fibers" as used herein include those formed from basalt, industrial smelting slags, alumina, zirconia, alumino-silicates and chrome, zircon and calcium modified alumino-silicates and the like.

We claim:

1. As an article of manufacture an intumescent conforming mounting pad for fragile structures comprised of a composite having at least two plies of intumescent sheet material adhesively bonded together over only a predetermined part of their adjoining faces and in an amount which allows said plies to slide past one another, said plies being offset a predetermined amount lengthwise whereby said pad can be bent around a fragile structure and the ends can be joined without cracking or buckling.

2. A mounting pad according to claim 1 wherein said plies are adhesively bonded at one end and offset at the other end.

3. A mounting pad according to claim 1 wherein said plies are adhesively joined near the center and one of the plies is offset on each end.

4. A mounting pad according to claim 1 wherein said plies are bonded enough to prevent rotation of said plies along the long axis of said plies.

5. A mounting pad according to claim 1 wherein said amount of bonding is less than about 20% of the average length of the composite.

6. A mounting pad according to claim 1 wherein said bonding is in one spot.

* * * * *